Oct. 30, 1962     A. DUERKSEN     3,060,508
BAND-TYPE RETREADING MOLD FOR TIRES
Original Filed June 18, 1956     2 Sheets-Sheet 1
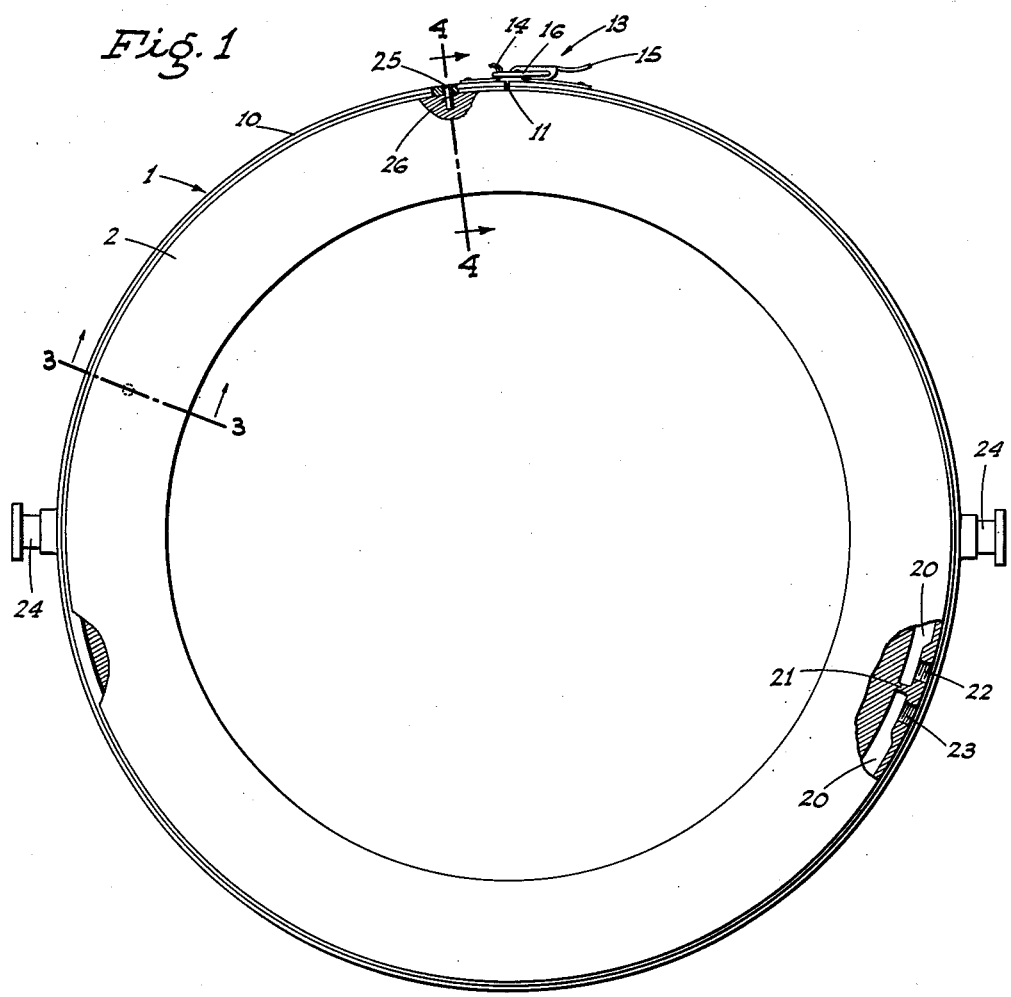
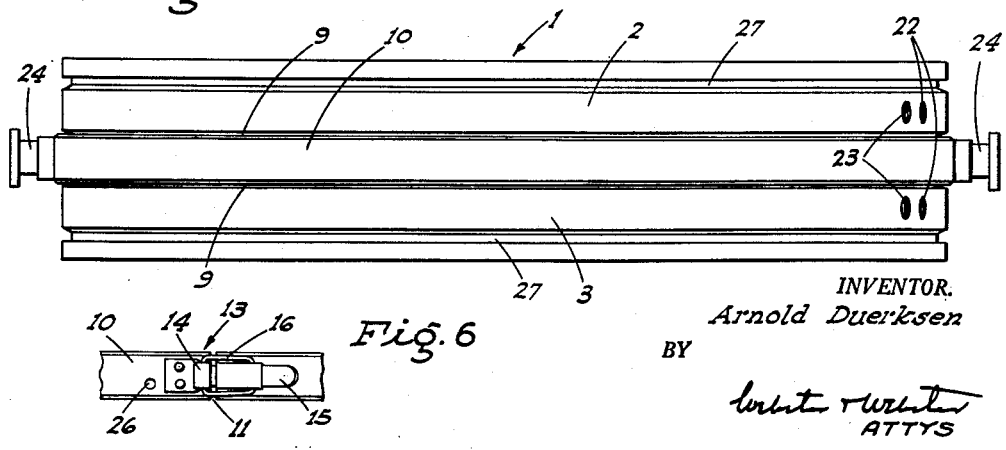
INVENTOR.
Arnold Duerksen
BY
ATTYS Oct. 30, 1962 A. DUERKSEN 3,060,508
BAND-TYPE RETREADING MOLD FOR TIRES
Original Filed June 18, 1956 2 Sheets-Sheet 2

INVENTOR.
Arnold Duerksen
BY
ATTYS

United States Patent Office 3,060,508
Patented Oct. 30, 1962

3,060,508
BAND-TYPE RETREADING MOLD FOR TIRES
Arnold Duerksen, Lodi, Calif., assignor to Super Mold Corporation of California, Lodi, Calif., a corporation of California
Continuation of application Ser. No. 591,974, June 18, 1956. This application June 15, 1959, Ser. No. 820,553
2 Claims. (Cl. 18—38)

The present invention is directed to, and it is a major object to provide, a novel self-contained, tire retreading mold of what may be generally termed "band type"; i.e., a unitary portable mold comprised essentially of an endless or full-circle body unit formed with a tire receiving matrix cavity, and having the heating medium directly associated with said body unit.

The term "retreading" as used herein is deemed to include the vulcanization of new treads on tires by "top capping," and for which the present mold is especially designed.

Another important object of the invention is to provide a band-type tire retreading mold which is designed to produce an excellent retread on tires, with the mold nevertheless of simplified structure, readily movable from point to point, and operative with a minimum of labor.

An additional object of the invention is to provide a band-type tire retreading mold which is adapted to have a tire placed therein for vulcanization, and subsequently removed, by means of a device such as the Tire Spreader shown in co-pending application Serial No. 595,370, filed July 2, 1956, now Patent No. 2,923,527, or the Press for Portable Tire Retreading Molds shown in co-pending application Serial No. 781,303, filed December 18, 1958.

A further object of the invention is to provide a band-type tire retreading mold which includes novel means for detachably suspending the mold from a hoist or the like used to move such mold from point to point.

It is also an object of the invention to provide a band-type tire retreading mold which—because of its self-contained nature—requires no large or heavy-duty mounting or supporting structure, and occupies a minimum of space.

Still another object of the invention is to provide a practical, reliable, and durable band-type tire retreading mold, and one which will be exceedingly effective for the purpose for which it is designed.

These objects are accomplished by means of such structure and relative arrangement of parts as will fully appear by a perusal of the following specification and claims.

In the drawings:

FIG. 1 is a plan view of the mold as horizontally disposed; the view being partly broken away and partly in section.

FIG. 2 is an elevation of the mold as in FIG. 1.

FIG. 6 is a fragmentary elevation showing the securing and tensioning latch for the clamping ring.

Referring now more particularly to the drawings, and to the characters of reference marked thereon, the mold comprising—in self-contained relation—a portable, full-circle vulcanizing band or body unit, indicated generally at 1; such body unit 1 being comprised of initially separate, full circle, body-half sections, indicated at 2 and 3.

Figure 3:
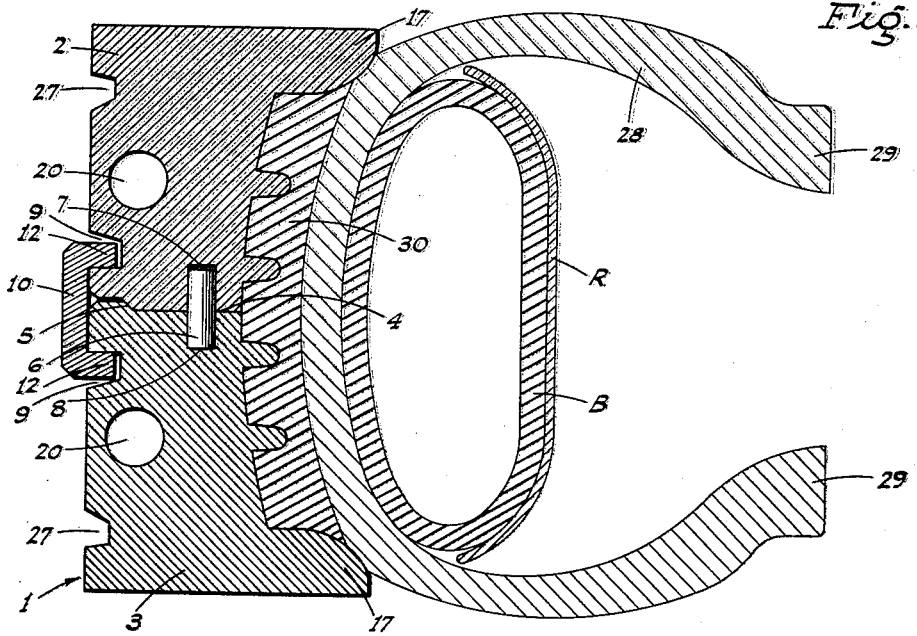
FIG. 3 is an enlarged transverse section taken on line 3—3 of FIG. 1, and showing the mold in its relationship to a tire inserted therein.
Figure 4:
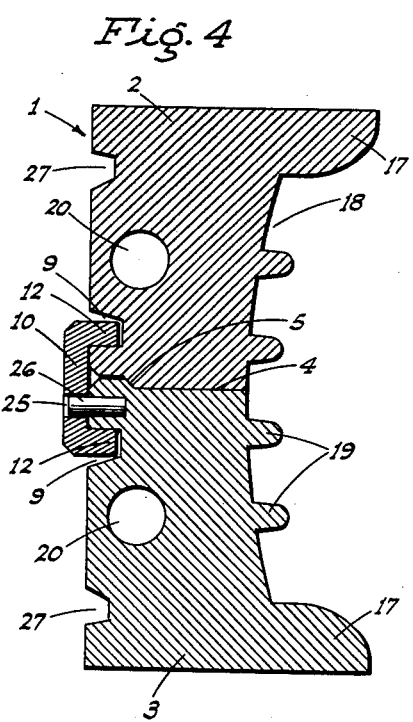
FIG. 4 is an enlarged transverse section taken on line 4—4 of FIG. 1

The body-half sections 2 and 3 are of cast metal, and—for a tire of a given width—such body-half sections matchingly abut at adjacent sides, as shown in FIGS. 3 and 4; the line of abutment being indicated at 4.

The adjacent sides of the body-half sections 2 and 3 are formed with a mating lateral offset 5 in said line of abutment 4 whereby to maintain said sections 2 and 3 in mating relationship radially.

In order to locate the body-half sections 2 and 3 in mating relationship circumferentially, a cross pin 6 spans between said sections, being seated at opposite ends in alined bores 7 and 8 formed therein and opening to the adjacent or inner sides.

The following means is provided for the purpose of detachably securing the body-half sections together in rigid unitary relation:

The body-half sections 2 and 3 are each formed——in the periphery, and adjacent but short of the inner side—with a circumferential groove 9.

A releasable clamping ring 10 surrounds the body unit 1 centrally thereof, and such clamping ring is split through, as at 11, at one point therein; the ring being radially resilient and of inwardly opening channel form in cross section, whereby such ring includes transversely spaced, inwardly extending flanges 12 which removably seat in the related grooves 9.

A securing and tensioning latch, of generally trunk type, and indicated generally at 13, connects between the free end portions of the clamping ring 10 in spanning relation to the split 11. Such latch 13 includes a hook catch 14 on one of such end portions, an over-dead-center lever 15 on the other of said end portions, and a connecting bail 16 carried by the lever 15 and adapted to engage the hook catch 14.

When the latch 13 is engaged, the clamping ring 10 is under tension, with the flanges 12 held seated in the grooves 9, whereby said ring then effectively secures the body-half sections 2 and 3 together in rigid unitary relation.

Each of the body-half sections 2 and 3 includes—at the outer side—a relatively short, radially inwardly projecting skirt 17; said skirts—together with the inner periphery of the body-half sections 2 and 3—defining a full-circle, tire receiving matrix cavity 18, and into which cavity the tread design forming elements 19 project from said sections 2 and 3.

In order to heat the mold, the body-half sections 2 and 3 each have heating means associated therewith; such means in the present embodiment comprising a circumferential passage 20 formed therein; there being a partition 21 across such passage at a predetermined point.

Tapped bores 22 and 23 communicate with the passage 20 adjacent but on opposite sides of the partition 21, said bores being adapted to be connected by suitable couplings to steam feed and return conduits (not shown). With this arrangement steam is circulated through the passage 20 in each body-half section whereby to heat the same.

At opposed points in the circumference thereof the clamping ring 10 is fitted with outwardly projecting lifting or supporting bosses 24 adapted to be engaged by carrier means such as the hoist shown in part in co-pending application Serial No. 595,370, or the dolly shown in co-pending application Serial No. 781,303. Such carrier means, of either type, is effective to readily move the mold from point to point.

In order to dispose the latch 13 at the top of the mold when the latter is vertical, and with the lifting bosses 24 centralized between the top and bottom, and above the tapped bores 22 and 23, the clamping ring 10 receives, in a bore 25 therein, a radial pin 26 which projects outwardly a short distance from one of the body-half sections.

When the above described mold is used with a tire spreader such as shown in said co-pending application Serial No. 595,370, a hoist is connected to the bosses 24, and the mold is then carried by the hoist and disposed horizontally in said spreader. The body-half sections 2 and 3 are each formed—in the periphery, and adjacent the outer side—with a circumferential groove 27. The one of such grooves which is lowermost, when the mold is disposed horizontally in the spreader, serves to receive locating or holding elements which the spreader includes.

In the spreader a tire 28 is inserted in the body unit 1 by spreading the tire beads 29 apart in an axial direction, and which has the effect of reducing the over-all diameter of the tire so that it can be moved into said body unit. Thereafter, the beads 29 are released, permitting the tire 28 to expand to its normal diameter, tightly fitting in the body unit 1, with the new tread rubber or camelback 30 on said tire engaged in the matrix cavity 18. The tire 28, as so disposed in the mold, carries therein an inflated inside curing bag B backed by an inside curing rim R.

Thereafter, the mold is again lifted by the hoist, transported to a suitable point, and set vertically for the vulcanizing operation; the steam feed and return conduits being coupled to the bores 22 and 23. Steam then circulates in the passage 20, heating the body unit 1 for the purpose of vulcanizing the new tread rubber or camelback 30 onto the tire 28.

The inside curing rim R is of a diameter, and a cross-sectional configuration, such that when the rim is disposed in the tire 28, as shown in FIG. 3, the rim edges are disposed relatively high in such tire, and a predetermined relatively short distance from the skirts 17. This assures against the inside curing bag B and the side walls of the tire 28 undesirably deforming outwardly between said rim edges and skirts during the vulcanizing operation, yet without the need of employing pressure plates or the like bearing against such side walls from the outside.

The inflated inside curing bag B, as backed by the inside curing rim R, imposes the force which urges the new tread rubber or camelback 30 all about the tread design forming elements 19 during the vulcanizing operation. Further, the inside curing rim R and the inside curing bag B are so proportioned that the pressure between such bag and the skirts 17 is effective to prevent the new tread material or camelback 30 from flowing—under vulcanizing temperatures—between said skirts 17 and the shoulders of the tire 28. In other words, the new tread rubber or camelback 30 is wholly confined in the matrix cavity 18 by reason of the skirts 17 being tightly abutted—under pressure—against the shoulders of the tire.

After the vulcanizing operation is complete, the conduits are disconnected from the bores 22 and 23 and the mold is returned by the hoist to the spreader, whereupon the latter is used to remove the tire 28 from the mold by merely reversing the operational steps employed to insert said tire.

When a mold—comprising generally the same combination as hereinbefore described—is used with a press, such as shown in co-pending application Serial No. 781,303, to place a tire in, or remove the same from the mold, the latter is supported by carrier means in the form of a dolly having cradles which receive the bosses 24; the mold being thus supported for transport between the point at which the vulcanizing operation is conducted, and the press. The bosses 24 permit the dolly-supported mold to be disposed vertically at the point of the vulcanizing operation, and horizontally for entry into the press; such selective positioning of the mold thus being the same as when the latter is hoist-suspended for use with a tire spreader as previously described.

Upon the mold being introduced into the press, the same is operative to separate the body-half sections 2 and 3 after release and detachment of the clamping ring 10, and which separation permits a tire to be placed in or removed from the then open mold. In the press, locking dogs or clamps carried by the platens, which said press includes, engage in the grooves 27 to secure the body-half sections 2 and 3 to said platens for the purpose of opening and closing the mold.

After a tire is placed in, or removed from the open mold in the press, the latter closes the mold by re-engaging the body-half sections 2 and 3; the clamping ring 10 is replaced, and, with the bosses in the cradles of the dolly, the mold is then removed from the press by said dolly and transported back to the point at which the vulcanizing operation is conducted.

It will thus be obvious that the mold, comprised of the mating body-half sections 2 and 3 and the clamping ring 10 with oppositely projecting bosses 24, is adapted to be supported by carrier means in the form of a hoist or a dolly when used with a tire spreader or a press, respectively, of the identified type. The supported mold—in either instance—is turnable about the bosses 24 between vertical and horizontal positions, and when the mold is horizontally disposed in either the tire spreader or press at least one of the grooves 27 serves to receive body-half retention elements.

Figure 5:
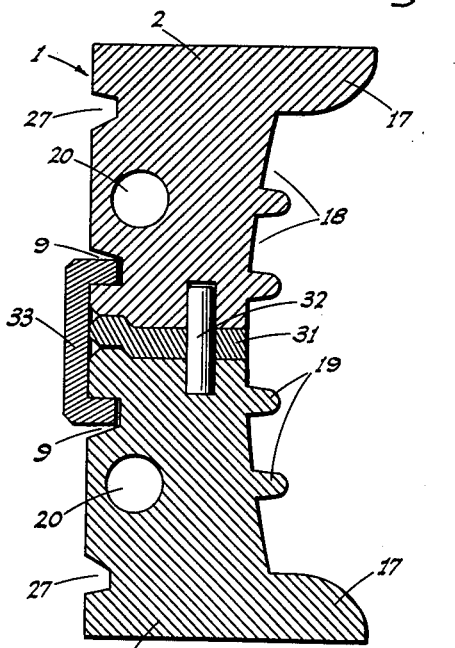
FIG. 5 is a view similar to FIG. 3, but without the tire, and showing the mold as used with the insert or spacer ring to increase the effective width.

When it is desired to increase the effective width of the mold, and for the purpose of vulcanizing a new tread on a tire of gerater width, a matching insert or spacer ring 31 is interposed between the body-half sections 2 and 3, as shown in FIG. 5; the cross pin 6 then being substituted by a longer cross pin 32, and the clamping ring 10 replaced by a wider clamping ring 33.

With the described band-type retreading mold new treads can be effectively vulcanized on a tire in a facile manner, yet with the mold embodying a minimum of structure.

This application is a continuation of application Serial No. 591,974, filed June 18, 1956 now abandoned.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A tire retreadng mold comprsng an annular body unit which is adapted to be heated, said unit including initially separate annular body-half sections adapted for matching engagement, said body-half sections when in matching engagement having inner faces which define a tire receiving and confining matrix, each body-half section being provided with a heating fluid receiving passage extending circumferentially of the same, each body-half section having a partition closing said passage and having radial inlet and outlet openings leading into said passage upon opposite sides of said partition, detachable means connecting the body-half sections to prevent relative circumferential turning movement between the same, a radially expanding clamping ring mounted upon the outer circumferential faces of the body-half sections and having detachable interlocking engagement therewith to hold said body-half sections in matching engagement with each other and with the passage openings of both sections in adjacent relationship, means for holding the ring in contracted condition, diametrically opposed bosses mounted upon the periphery of the clamping ring and separate from the body half sections; said bosses being adapted for engagement with supporting means and permitting the body-half sections and the clamping ring to be shifted to substntially vertical and horizontal positions when said bosses engage the supporting means, and detachable pin means for connecting the clamping ring and one body-half section to prevent relative circumferential movement of the clamping ring and locating the same with relation to the body-half sections so that the radial openings of said body-half sections may be retained adjacent and to one side of one boss.

2. In a self-contained portable tire retreading mold which includes a body unit comprised of initially separate annular body-half sections disposed in matching edge-to-edge abutment to then define a tire receiving cavity; a releasable clamping ring engaging and surrounding the body unit, means between the clamping ring and sections normally preventing axial separation of the latter, the sections being adapted to be heated and each section being adapted at a point in its periphery for coupling with a source of heat, locating means between the sections to dispose said coupling points in substantial alinement transversely of the mold when said sections are in abutment, outwardly projecting diametrically opposed bosses on the clamping ring for relative swinging engagement with supporting means, and detachable pin means for connecting the clamping ring and one section to prevent relative circumferetial movement of the clamping ring and locating the same with relation to the sections so that said coupling points on the sections will be retained adjacent and to one side of one boss.

References Cited in the file of this patent

UNITED STATES PATENTS

| | | |
|---|---|---|
| 1,014,192 | Williams | Jan. 9, 1912 |
| 1,418,137 | Druse | May 30, 1922 |
| 1,525,652 | Leppert | Feb. 10, 1925 |
| 1,610,396 | Tinker | Dec. 14, 1926 |
| 1,655,861 | Fritz | Jan. 10, 1928 |
| 2,111,233 | Zangl | Mar. 15, 1938 |
| 2,271,855 | Cleveland et al. | Feb. 3, 1942 |
| 2,375,784 | Glynn | May 15, 1945 |
| 2,699,343 | Troeger et al. | Jan. 11, 1955 |
| 2,714,469 | Carlson | Aug. 2, 1955 |

FOREIGN PATENTS

| | | |
|---|---|---|
| 26,073 | Netherlands | Feb. 14, 1932 |
| 961,669 | France | May 17, 1950 |
| 664,608 | England | Jan. 9, 1952 |
| 850,521 | Germany | Sept. 25, 1952 |